Figure 1:
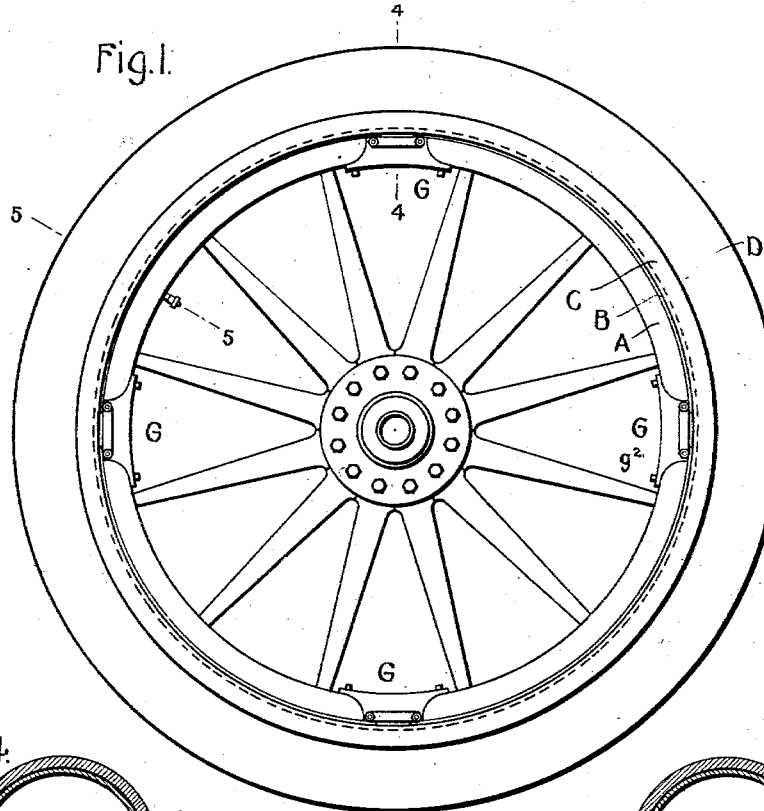

No. 746,693. PATENTED DEC. 15, 1903.
H. G. GRIER.
VEHICLE WHEEL.
APPLICATION FILED JAN. 17, 1903.
NO MODEL. 2 SHEETS—SHEET 1.

Witnesses
J. Ellis Glenn.
Bertha Senor.

Inventor:
Harry G. Grier

No. 746,693. PATENTED DEC. 15, 1903.
H. G. GRIER.
VEHICLE WHEEL.
APPLICATION FILED JAN. 17, 1903.
NO MODEL. 2 SHEETS—SHEET 2.

Witnesses.
J. Ellis Glenn.
Bertha Secor.

Inventor.
Harry G. Grier

No. 746,693. Patented December 15, 1903.

UNITED STATES PATENT OFFICE.

HARRY G. GRIER, OF EAST ORANGE, NEW JERSEY.

VEHICLE-WHEEL.

SPECIFICATION forming part of Letters Patent No. 746,693, dated December 15, 1903.

Application filed January 17, 1903. Serial No. 139,480. (No model.)

*To all whom it may concern:*

Be it known that I, HARRY G. GRIER, a citizen of the United States, residing at East Orange, in the county of Essex, State of New Jersey, have invented certain new and useful Improvements in Vehicle-Wheels, of which the following is a specification.

My invention relates more particularly to pneumatic-tired vehicle-wheels, and has for its object to provide a novel construction which will permit of the ready removal of a deflated tire and its replacement by one that is inflated without the difficulties attendant upon such an operation with the constructions now in use.

The invention is particularly adapted for use in wheels that are provided with inner-tube tires, though in its broadest aspect it is not limited thereto.

Practically all the automobiles now manufactured are provided with pneumatic tires, and in nearly every vehicle of this character inner-tube tires are employed, the outer cover being removably secured to the felly of the wheel by means of clamping-bolts extending radially through the same and provided on their inner ends with nuts for drawing the clamping-heads of the bolts into close contact with the coacting portions of the cover. By loosening the nuts and releasing the clamping-heads of the bolts the cover or outer tube may be removed to permit of the insertion of a new inner tube. It is well known that such tires are very difficult to manipulate, especially such tires as are suitable for use on heavy vehicles, and that the process of removing the cover, inserting a new inner tube, and replacing the tire on the wheel while on the road requires much time and no inconsiderable amount of manual labor.

It is the object of my invention to avoid the necessity for dismembering the tire or removing it from the rim on which it is mounted in case of a puncture. I accomplish this result by mounting the tire on a rigid outer rim having projections on its inner periphery adapted to receive the clamping-bolts necessary to hold the cover in position on the rim and providing the felly of the wheel with suitable slots or grooves for receiving these projections and with fastening devices for holding the rim securely in position on the felly. In case a single-tube tire is used the clamping-bolts may be dispensed with.

My invention will be better understood by reference to the following description, taken in connection with the accompanying drawings, in which—

Figure 4:
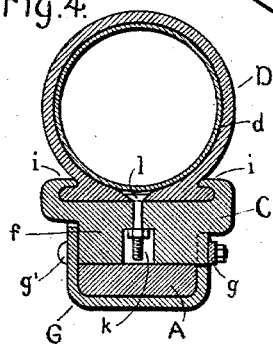
Figure 5:
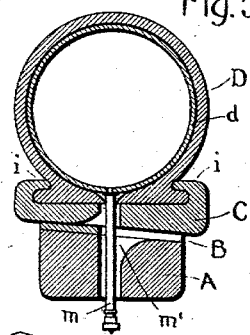
Figure 6:
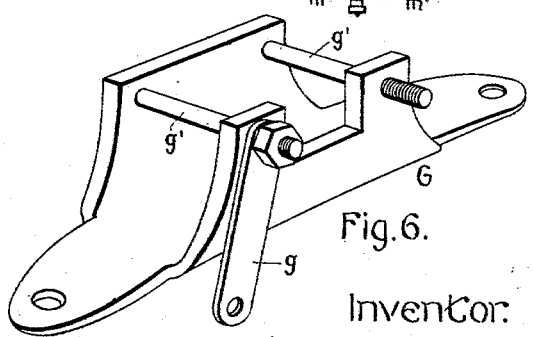
Figure 2:
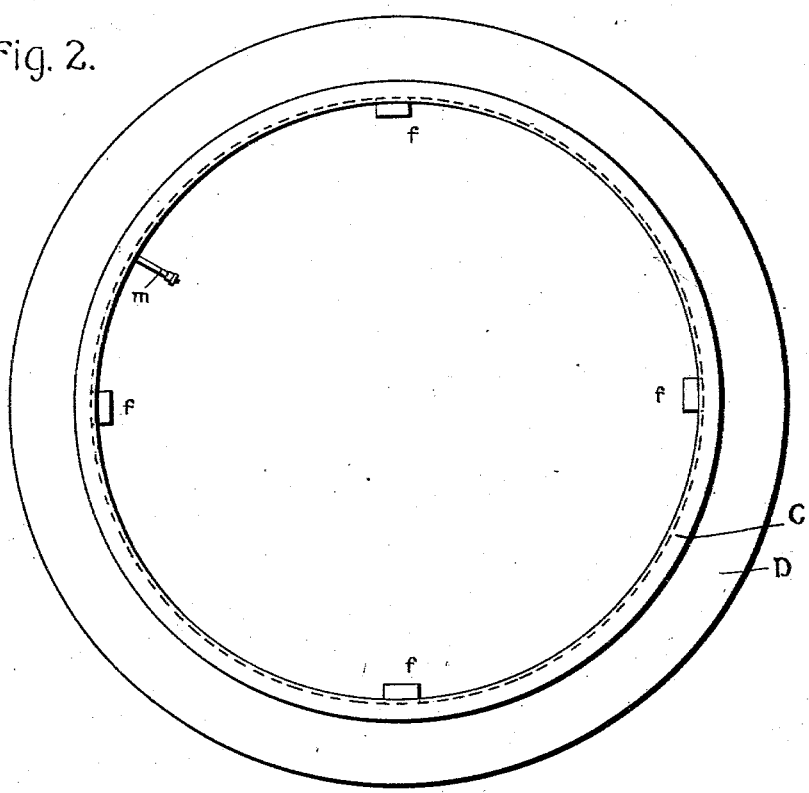
Figure 3:
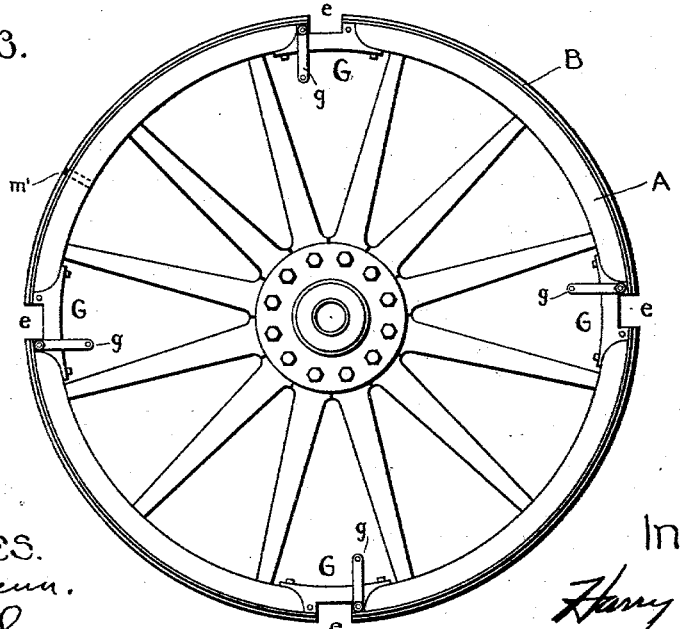

Figure 1 is a view of a complete vehicle-wheel constructed in accordance with the principles of my invention. Fig. 2 is a view of the rim with the tire mounted thereon. Fig. 3 is a view of the wheel proper, showing the felly cut away or slotted to receive the projections on the inner periphery of the rim and showing also the fastening devices for holding the rim in position on the felly. Fig. 4 is a view in cross-section along the line 4 4 of Fig. 1. Fig. 5 is a view in cross-section along the line 5 5 of Fig. 1, and Fig. 6 is a view in perspective of the malleable-iron fitting to which the fastening device is preferably secured.

Referring first to Figs. 1, 2, and 3, A represents the felly of a vehicle-wheel, C a rim which is arranged to be removably secured thereon, and D a tire mounted on the rim. The felly of the wheel has its outer face slightly beveled, so that the rim may fit securely thereon when it is driven home, and the beveled surface is preferably covered with a metal band B both for the purpose of protecting the woodwork of the wheel and for presenting an unyielding surface for engagement with the inner periphery of the rim. The felly is slotted or cut away at a number of points $e$ along its periphery, and the rim C is provided with a corresponding number of lugs or projections $f$, adapted to engage the slots when the rim is mounted on the felly. Because of the slight bevel on the felly and on the rim the latter may be driven on until a good fit is secured. The lugs on the rim and the slots in the felly enable the rim to be easily started on in such a position that the valve-tube $m$ will come opposite the hole $m'$ in the felly, and, moreover, prevent the rim from slipping on the felly after it is once in position. The lugs also serve in connection with the fastening devices $g$ as a means for securing the rim to the wheel. In addition to the above-specified functions the lugs serve to inclose the inner ends of the clamping-bolts, by means of which the tire is fastened to the rim, and permit the necessary range of movement for the nuts which secure the bolts.

The fastening devices g are preferably mounted on malleable-iron fittings G, which are used to strengthen the felly at the points where it is cut away. Each of these fittings comprises a body portion arranged to be bolted to the wheel on the inside and having upwardly-projecting portions adapted to engage the sides of the felly. One of these projecting portions is cut away or slotted to fit the slot in the wheel. The fitting is provided with two bolts g' g', which serve both as means for securing the fitting to the wheel and as means for fastening the clamping-strips g against the ends of the lugs f after the rim has been mounted on the wheel. The position of all the parts when the rim is secured on the wheel is shown in Figs. 1 and 4, the latter figure also showing the arrangement of the clamping-bolts k with their clamping-heads l, by means of which the outer tube is secured to the rim. Fig. 5 shows the way in which the holes in the rim and in the felly are cut away on one side to afford a passage for the valve-tube when the rim is being taken off or put on the wheel.

Of course some other means than the clamping-bolts shown in the drawings may be used to secure the double-tube tire to the rim, and for single-tube tires other securing means will generally be employed.

I have not deemed it necessary to discuss in detail the manner in which the inner-tube tire is mounted on the rim C, since the mounting of such tires is a matter which is now well understood. The general arrangement of the parts is indicated in Fig. 4, from which it will be seen that the edges of the outer tube or cover extend beneath inwardly-projecting flanges i on the rim and are held therein by the heads of the clamping-bolts k. In actual construction a protecting-strip, of canvas or other suitable material, would be inserted between the head l of the clamping-bolt and the inner tube d; but this is a detail of construction having nothing to do with my invention, and hence is not illustrated.

In using my invention on automobiles or in connection with any road-vehicles one or more extra tires mounted on their rims and suitably inflated may be carried on the vehicle. In case of puncture the fastening devices may be loosened, the rim removed, and a new rim, with its tire, substituted, leaving the removal of the inner tube or the repairing of the single tube of the tire on the rim which has been removed to be made at the end of the trip, or at least at some place where the work can be accomplished more easily and more speedily than on the road.

While the construction which I have disclosed herein is particularly designed for use in a vehicle-wheel provided with pneumatic tires, it is evident that with respect to some of its features my invention is not limited to a tire of any particular type.

What I claim as new, and desire to secure by Letters Patent of the United States, is—

1. In combination with a vehicle-wheel, a rigid outer rim removable therefrom, a tire secured to said rim, lugs or projections on the inside of the rim, corresponding slotted or cut-away portions on the felly of the wheel, and fastening devices for securing the rim to the wheel.

2. In combination with a vehicle-wheel, a rigid outer rim removable therefrom, an inner-tube tire mounted on said rim, clamping devices for securing the outer tube to the rim, lugs or projections on the inside of the rim, corresponding slotted or cut-away portions on the felly of the wheel, and fastening devices for securing the rim to the wheel.

3. In combination with a vehicle-wheel, a rigid outer rim removable therefrom, an inner-tube tire mounted on said rim, lugs or projections on the inside of the rim, clamping-bolts for securing the outer tube to the rim the said bolts extending into the said projections, slotted or cut-away portions on the felly of the wheel corresponding in position to the projections on the rim, and fastening devices for securing the rim to the wheel.

4. In combination with a vehicle-wheel, a rigid outer rim removable therefrom, a tire mounted on said rim, lugs or projections on the inside of the rim, corresponding slotted or cut-away portions on the felly of the wheel, and fastening devices consisting of clamping-strips secured to the felly and arranged to engage the ends of the projections on the rim to hold the same on the wheel.

5. In combination with a vehicle-wheel, a rigid outer rim removable therefrom, a tire mounted on said rim, lugs or projections on the inside of the rim, corresponding slotted or cut-away portions on the felly of the wheel, metal fittings for strengthening the wheel at the points where it is cut away, and fastening devices consisting of clamping-strips secured to the fittings and arranged to engage the ends of the projections on the rim to hold the same on the wheel.

In witness whereof I have hereunto set my hand this 15th day of January, 1903.

HARRY G. GRIER.

Witnesses:
HAYGARTH LEONARD,
L. C. FOSS.